United States Patent Office 2,885,400
Patented May 5, 1959

2,885,400
SYNTHETIC ANTIBACTERIALS

Richard U. Schock, Waukegan, Ill., assignor to Abbott Laboratories, North Chicago, Ill., a corporation of Illinois No Drawing. Application April 8, 1957
Serial No. 651,144

1 Claim. (Cl. 260—249.9)

This invention relates to a novel synthetic antibacterial and to a method for making same.

More specifically, the invention relates to the chemical compound 2 - [2 - (5 - nitrofuryl)]-4,6-diamino-s-triazine represented by the following chemical formula

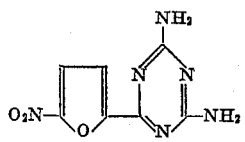

This chemical compound is made in one process by condensing ethyl-5-nitro-2-furoate with biguanide in approximately equimolar proportions in a polar liquid. The details of this reaction are given in the example.

This chemical compound is a systemic antibacterial showing activity against gram positive and gram negative organisms such as *Micrococcus pyogenes* var. *aureus, E. coli* and *Salmonella typhimurium*. It is also an intermediate in the preparation of substituted nitrofuryl triazines in which substitution takes place on the amino nitrogens such as with an alkyl, methylol or carbamyl group, and with other groups which are known to condense with a primary amino group.

The following example is given to provide specific detail of the operation of the invention. It is not intended however to be a limitation thereon.

EXAMPLE I
2-[2-(5-nitrofuryl)]-4,6-diamino-s-triazine

To a stirred suspension of ethyl-5-nitro-2-furoate (9.26 g.; 0.050 mole) in 60 ml. of absolute methanol is added a solution of biguanide (5.06 g.; 0.050 mole) in 15 ml. of absolute methanol. The suspension which forms is stirred overnight at room temperature and the tan-colored solid is collected and washed with methanol. The yield is 8.16 g. (73.5% of theory), melting with decomposition at 362° C. (uncorr.). For purification, the material is crystallized from boiling dimethylformamide. In this manner a yellow colored crystalline product is obtained with unchanged melting point. Analysis of this material after drying at 80° in vacuo shows it to be the mono-dimethylformamide solvate of the above-named product.

Calculated for $C_7H_6O_3N_6 \cdot C_3H_7OH$: C, 40.68; H, 4.43; O, 21.68; N, 33.21. Found: C, 40.79; H, 4.50; O, 21.92; N, 33.02.

Drying at 153° in vacuo provides the pure triazine named above (again the melting point is unchanged).

Calculated for $C_7H_6O_3N_6$: C, 37.84; H, 2.72; O, 21.61; N, 37.83. Found: C, 37.89; H, 2.73; O, 21.62; N, 37.59.

I claim:
2-[2-(5-nitrofuryl)]-4,6-diamino-s-triazine.

References Cited in the file of this patent

UNITED STATES PATENTS 2,535,968     Thurston et al. _____ Dec. 26, 1950

FOREIGN PATENTS 475,469     Canada _____ July 24, 1951

OTHER REFERENCES

Chemical Abstracts, vol. 49, pages 11460–11461, Abstract of Sasaki Pharm. Bull. (Japan), vol. 2, 99–104 (1954).

Chemical Abstracts, vol. 44, pp. 9404–5 (1950), Abstract of Dodd et al., J. Am. Pharm. Assoc., vol 39, pp. 313–18 (1950).